Dec. 20, 1949     C. D. BRANSON     2,491,548
DEVICE RESPONSIVE TO VARIABLE DENSITY
Filed July 24, 1945
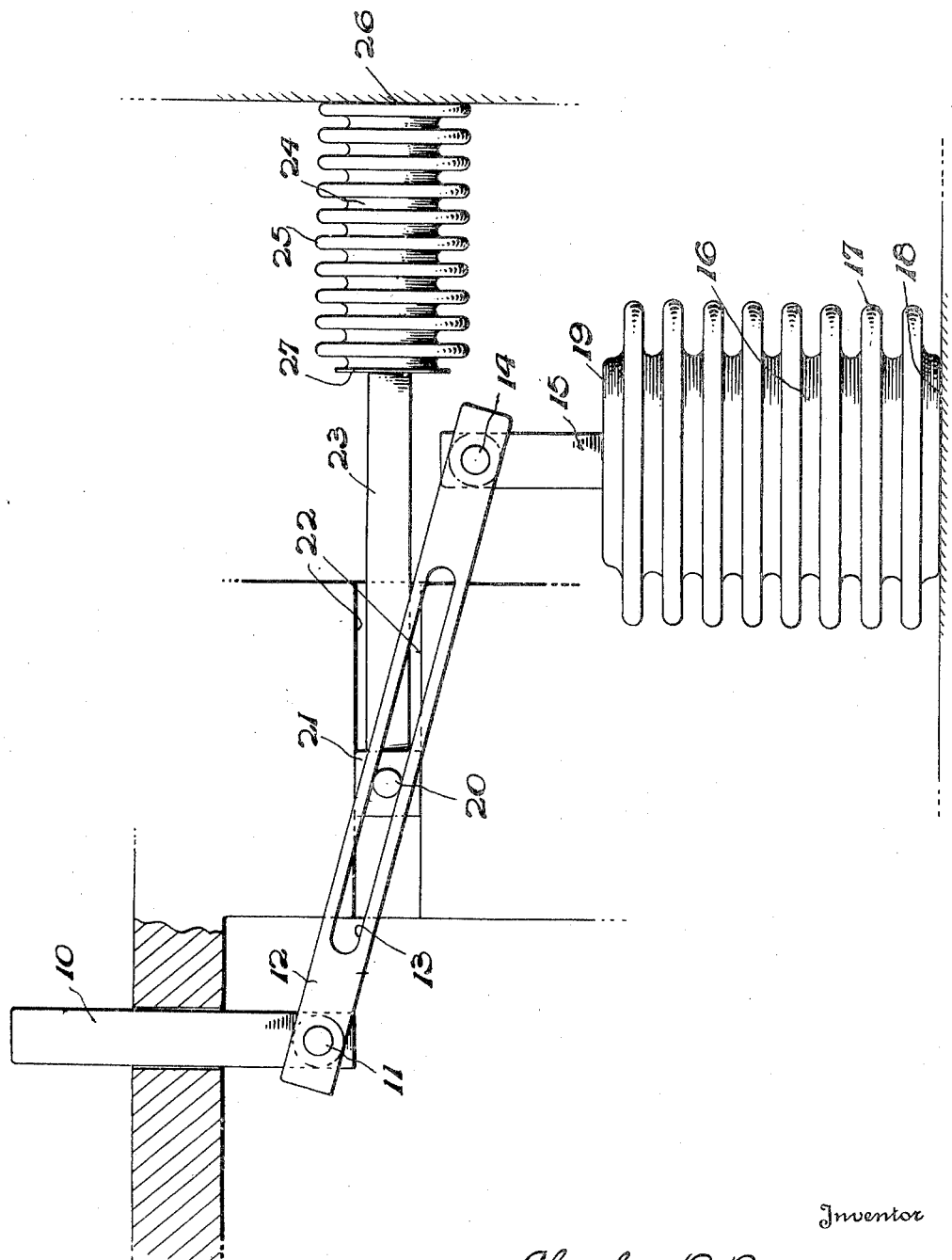
Inventor
Charles D. Branson
By Cameron Kerkam & Sutton
Attorney Patented Dec. 20, 1949

2,491,548

UNITED STATES PATENT OFFICE 2,491,548

DEVICE RESPONSIVE TO VARIABLE DENSITY

Charles D. Branson, Knoxville, Tenn., assignor to Robertshaw-Fulton Controls Company, a corporation of Delaware Application July 24, 1945, Serial No. 606,766

7 Claims. (Cl. 236—92)

This invention relates to means for responding to variations in the density of air or other gases, and more particularly to means responding accurately to changes in gas density for positioning a means to be controlled, whether the latter be an indicator or recorder or a control element such as a valve, switch, etc.

It is an object of this invention to provide a device of the type characterized which is accurately responsive to changes in gas density so as to reflect correctly the composite effect of changes of temperature and pressure on the gas.

Another object of this invention is to provide a device of the type characterized which is simple in construction, direct and certain in action, and applicable to a wide variety of uses.

Other objects will appear as the description of the invention proceeds.

The invention is capable of receiving a variety of mechanical expressions only one of which is illustrated on the accompanying drawing, and therefore it is to be expressly understood that the drawing is for purposes of illustration only, and is not to be construed as a definition of the limits of the invention, reference being had to the appended claims for that purpose.

Referring to said drawing the figure shows diagrammatically an embodiment of the present invention.

Any suitable means to be controlled, as an indicator needle, recorder stylus, or the like or the actuator of a valve, switch or other suitable controlling means, is indicated at 10. Pivotally or swively connected at 11 to member 10 is a lever 12 having a slot 13. The opposite end of lever 12 is pivotally or swively connected at 14 to a post or stem 15 operated by any suitable pressure responsive element 16, here shown as a spring loaded expansible and collapsible vessel having a tubular corrugated wall 17, a stationary end wall 18 supported in any suitable way and a movable end wall 19 to which the stem is appropriately connected. Vessel 16 is evacuated and spring loaded either by the inherent resilience of its corrugated wall 17 or a spring applied thereto externally or internally, to cause expansion and contraction of said vessel proportionately to the changes in gas pressure acting on movable wall 19 and substantially independently of variations in the temperature to which said vessel is subjected.

Received in the slot 13 of lever 12 is a fulcrum member 20, here shown as a pin or roller, carried by a rectilinearly movable member or block 21 constrained in any suitable way to move in a straight line as by a suitable guide 22. Member 21 is actuated by a post or stem 23 from any suitable thermostat 24, here shown as a spring loaded expansible and collapsible vessel having a tubular corrugated wall 25, a stationary end wall 26 supported in any suitable way and a movable end wall 27 to which the stem 23 is appropriately connected. Vessel 24 is solidly filled with any suitable temperature responsive liquid and spring loaded either by the inherent resilience of its corrugated wall 25 or a spring applied thereto externally or internally, to cause expansion and contraction of said vessel 24 in response to changes in the temperature to which said vessel is subjected substantially independently of variations in the pressure acting on said vessel.

Vessel 16 is so constructed and adjusted that, at zero pressure absolute, pivot axis 14 lies on the line of rectilinear movement of the fulcrum 20, at which time pivot axis 11 lies on the same line, so that, in conformity with the theory that at zero pressure absolute no density exists irrespective of temperature, changes of temperature producing movement of stem 23 will have no effect on the position of member 10. Fulcrum 20 can move only in a straight line, in a plane determined by the pivot axes 11 and 14 when at zero pressure absolute, and at right angles to the mean line of movement of stem 15. Under actual pressure conditions, however, said lever and stem normally make an acute angle with each other. As either pressure variations at constant temperature or temperature variations at constant pressure or simultaneous variations in both temperature and pressure will produce variations in density according to the basic formula $$P = DBT$$

where P is the pressure in pounds per square foot absolute, D is the density in pounds per cubic foot, B is the universal gas constant and T is the temperature in degrees absolute, member 10 is moved by the composite action of stem 23 and lever 12 to conform with the instantaneous gas density acting on vessels 16 and 24 provided the spring loading of the two vessels 16 and 24 is such that their respective expansions and contractions follow accurately the respective changes in pressure independently of temperature and changes in temperature independently of pressure of the gas to which they are subjected. Thus with increase of pressure, vessel 16 decreases in length changing the angle between lever 12 and stem 23 and producing a proportionate upward movement of member 10 (as viewed in the drawing), lever 12 merely pivoting around fulcrum 20 as long as the temperature remains constant. Thereby member 10 moves only in response to and proportionately to changes in pressure to conform with the requirement that density vary directly with pressure. The reverse occurs on decrease of pressure. On the other hand, assuming a pressure above zero absolute, if the temperature increases without change in pressure, vessel 24 expands to alter the location of fulcrum 20 and therefore to produce a downward movement of member 10 (as viewed in the drawing) proportionately to the expansion of vessel 24, but at a varying rate, and conforming with the requirement that density vary inversely with the temperature. The reverse occurs on decrease of temperature.

It will be observed that increments of expansion of vessel 24 produce a progressively decreasing movement of member 10 because of decreasing angularity between lever 12 and stem 23, while increasing pressures acting on vessel 16 will increase the angularity between lever 12 and stem 23 so as to produce increased movement at 10 for increments of expansion of vessel 24. Also changes of temperature alter the ratio of the lever arms of lever 12 so that given movements of vessel 16 produce greater or smaller movements of member 10 depending on whether the temperature is lower or higher. Thereby for any given density of the air the member 10 may be made to assume the same predetermined position by properly predetermining the rates of expansion and contraction of vessels 16 and 24 due to the spring loading thereof, because vessel 24 can be so constructed that the fulcrum 20 is changed with changes of temperature to produce variable response to varying pressures consistent with the effect of changing pressures on density at different temperatures, while vessel 16 can be so constructed that the angularity between lever 12 and stem 23 is changed with changes of pressure to produce variable response to variable temperatures consistent with the effect of changing temperature on density at different pressures. Thus the effect of unit temperature changes is caused to be greater as the pressure increases, the effect of unit temperature change decreasing with increased temperature, and the effect of unit pressure changes is caused to be greater as the temperature decreases, all as required to produce an accurate response to changes of density.

It will therefore be perceived that by the present invention a simple, compact and accurately functioning device may be provided for disposing a member to be controlled in conformity with variations in density as produced by variations in both the temperatures and pressures.

While the embodiment shown diagrammatically on the drawing has thus been described with considerable particularity it is to be expressly understood that the invention is not to be restricted thereto as the invention is capable of receiving a variety of expressions as will now be apparent to those skilled in the art. While pressure and temperature responsive elements of the type employing bellows are preferred it will be apparent that any other suitable type of thermostat or any other suitable pressure sensitive device may be used. Changes may also be made in the details of construction, arrangement, proportion, etc. without departing from the spirit of this invention. Reference is therefore to be had to the appended claims for a definition of the limits of the invention.

What is claimed is:

1. In a device for responding to variations in density, in combination with means to be controlled, a pressure responsive device, a temperature responsive device, means for compounding the movements of said devices including a lever having its opposite ends operatively connected to said pressure responsive device and to said means to be controlled respectively, means providing a fulcrum for said lever dividing said lever into lever arms on opposite sides of said fulcrum, said fulcrum means being movable with respect to said lever to vary the lengths of said lever arms, and a member for moving said fulcrum means operatively connected to said temperature responsive device.

2. In a device for responding to variations in density, in combination with means to be controlled, a pressure responsive device substantially non-responsive to temperature variations, a temperature responsive device substantially non-responsive to pressure variations, means for compounding the movements of said devices including a lever having its opposite ends operatively connected to said pressure responsive device and to said means to be controlled respectively, means providing a fulcrum for said lever dividing said lever into lever arms on opposite sides of said fulcrum, said fulcrum means being movable with respect to said lever to vary the lengths of said lever arms, and a member for moving said fulcrum means operatively connected to said temperature responsive device.

3. In a device for responding to variations in density, in combination with means to be controlled, a temperature responsive device, a rectilinearly movable member operatively connected to said temperature responsive device, a pressure responsive device, a lever having a fulcrum and lever arms which are operatively connected to said pressure responsive device and to said means to be controlled respectively, and an adjustable member on which said fulcrum is mounted, said adjustable member being operable by said rectilinearly movable member and movable thereby lengthwise with respect to said lever for adjusting the lengths of said lever arms.

4. In a device for responding to variations in density, in combination with means to be controlled, a temperature responsive device, a rectilinearly movable member operatively connected to said temperature responsive device, a pressure responsive device, a lever having a fulcrum and lever arms which are operatively connected to said pressure responsive device and to said means to be controlled respectively, and an adjustable member on which said fulcrum is mounted, said adjustable member being operable by said rectilinearly movable member and movable thereby lengthwise with respect to said lever for adjusting the lengths of said lever arms, the connection between said pressure responsive device and said lever being of such length as to dispose said lever at an angle to said rectilinearly movable member at all pressures above zero absolute pressure.

5. In a device for responding to variations in density, in combination with means to be controlled, a temperature responsive device, a rectilinearly movable member operatively connected to said temperature responsive device, a pressure responsive device, a lever having a fulcrum and lever arms which are operatively connected to said pressure responsive device and to said means to be controlled respectively, and an adjustable member on which said fulcrum is mounted, said adjustable member being operable by said rectilinearly movable member and movable thereby lengthwise with respect to said lever for adjusting the lengths of said lever arms, said lever being normally disposed at an angle to said rectilinearly movable member and said pressure responsive device being so connected to said lever as to increase its angularity with respect to said rectilinearly movable member upon contraction of said pressure responsive device.

6. In a device for responding to variations in density, in combination with means to be controlled, a temperature responsive device, a rectilinearly movable member operatively connected to said temperature responsive device, a pressure responsive device, a lever having a fulcrum and lever arms which are operatively connected to said pressure responsive device and to said means to be controlled respectively, and an adjustable member on which said fulcrum is mounted, said adjustable member being operable by said rectilinearly movable member and movable thereby lengthwise with respect to said lever for adjusting the lengths of said lever arms, said lever being normally disposed at an angle to said rectilinearly movable member and said rectilinearly movable member being so connected to said lever as to decrease its angularity with respect to said rectilinearly movable member upon expansion of said temperature responsive device.

7. In a device for responding to variations in density, in combination with means to be controlled, a lever having lever arms one of which is operatively connected to said means, a rectilinearly movable member, means on said rectilinearly movable member providing a fulcrum for said lever and movable by said rectilinearly movable member relatively to said lever to adjust the lengths of said lever arms, a pressure responsive device operatively connected to the other of said lever arms and operable to move said means to be controlled proportionately to the movements of said pressure responsive device for any given position of said fulcrum, and a temperature responsive device operatively connected to said rectilinearly movable member and operable to move said fulcrum lengthwise of said lever to decrease the response of said lever to said temperature responsive device upon expansion of said temperature responsive device.

CHARLES D. BRANSON.

REFERENCES CITED

The following references are of record in the file of this patent:

UNITED STATES PATENTS

| Number | Name | Date |
|---|---|---|
| 1,913,684 | Purdy | June 13, 1933 |
| 2,111,855 | Groh | Mar. 22, 1938 |
| 2,376,711 | Mock | May 22, 1945 |
| 2,396,279 | Metsger | Mar 12, 1946 |

FOREIGN PATENTS

| Number | Country | Date |
|---|---|---|
| 135,557 | Great Britain | Dec. 4, 1919 |